(12) United States Patent
Bandi et al.

(10) Patent No.: US 12,233,737 B2
(45) Date of Patent: Feb. 25, 2025

(54) WIRELESS CHARGING USAGE DETERMINATION SYSTEM, VEHICLE FOR SAME, AND ASSOCIATED METHOD

(71) Applicant: Ford Global Technologies, LLC, Dearborn, MI (US)

(72) Inventors: Krishna Bandi, Farmington Hills, MI (US); Nancy Lewis, Ann Arbor, MI (US); Javarri Little, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 299 days.

(21) Appl. No.: 18/066,720

(22) Filed: Dec. 15, 2022

(65) Prior Publication Data
US 2024/0198834 A1    Jun. 20, 2024

(51) Int. Cl.
| | |
|---|---|
| *B60L 53/62* | (2019.01) |
| *B60L 53/12* | (2019.01) |
| *B60L 53/30* | (2019.01) |
| *B60L 53/66* | (2019.01) |
| *G01C 21/34* | (2006.01) |
| *G06Q 20/14* | (2012.01) |

(Continued)

(52) U.S. Cl.
CPC .............. *B60L 53/62* (2019.02); *B60L 53/12* (2019.02); *B60L 53/30* (2019.02); *B60L 53/665* (2019.02); *G01C 21/3484* (2013.01); *G06Q 20/145* (2013.01); *H02J 7/342* (2020.01); *H02J 50/10* (2016.02); *B60L 2240/12* (2013.01)

(58) Field of Classification Search
CPC ...................................................... B60L 53/62
See application file for complete search history.

(56) References Cited

U.S. PATENT DOCUMENTS

| 9,937,811 B2 * | 4/2018 | Tabatowski-Bush ... B60L 53/65 |
| 10,403,113 B1 * | 9/2019 | Antar ...................... G01V 3/081 |

(Continued)

FOREIGN PATENT DOCUMENTS

| CA | 2715937 A1 * | 3/2011 | ............... B60N 2/90 |
| CN | 202748850 U * | 2/2013 | |

(Continued)

OTHER PUBLICATIONS

Young Jae Jang, Survey of the Operation and System Study on Wireless Charging Electric Vehicle Systems, Transportation Research, Part C 95, Apr. 23, 2018, 844-866.

(Continued)

*Primary Examiner* — Shelley Chen
(74) *Attorney, Agent, or Firm* — Emily Drake; Eversheds Sutherland (US) LLP

(57) ABSTRACT

A wireless charging usage determination system is provided. The wireless charging usage determination system includes a charging system having a charging source, and a vehicle including an inductive charger configured to receive a charge from the charging source, a processor electrically connected to the inductive charger, and a memory. The memory has instructions that, when executed by the processor, cause the processor to perform operations including receiving a wireless alert notification from the charging system, energizing the inductive charger based on a response to the wireless alert notification, and determining wireless charging usage responsive to the inductive charger being energized.

20 Claims, 17 Drawing Sheets

(51) Int. Cl.
*H02J 7/34* (2006.01)
*H02J 50/10* (2016.01)

(56) References Cited

U.S. PATENT DOCUMENTS

| | | | |
|---|---|---|---|
| 2013/0049683 A1* | 2/2013 | Farkas | B60L 53/126 |
| | | | 320/108 |
| 2016/0297316 A1* | 10/2016 | Penilla | G06Q 30/0232 |
| 2020/0161897 A1* | 5/2020 | Dudar | H02J 7/0044 |
| 2021/0223128 A1* | 7/2021 | Kirch | G01L 19/083 |
| 2021/0394632 A1* | 12/2021 | McCool | H02J 50/12 |
| 2022/0032808 A1 | 2/2022 | Oh et al. | |
| 2022/0238931 A1* | 7/2022 | Austin | B60L 53/38 |
| 2023/0249559 A1* | 8/2023 | Schrafel | H02J 50/70 |
| 2024/0138308 A1* | 5/2024 | Dicke | A01D 34/78 |
| 2024/0140215 A1* | 5/2024 | Dicke | B60L 53/38 |
| 2024/0140216 A1* | 5/2024 | Kromrey | H02J 50/90 |

FOREIGN PATENT DOCUMENTS

| | | | | |
|---|---|---|---|---|
| CN | 105691352 A | * | 6/2016 | B60L 53/12 |
| CN | 106571654 A | * | 4/2017 | B60L 11/1846 |
| CN | 106945548 A | * | 7/2017 | |
| CN | 107867197 A | * | 4/2018 | B60L 11/182 |
| EP | 3696346 A1 | * | 8/2020 | B62H 3/00 |
| EP | 3984809 A1 | | 4/2022 | |
| JP | 2024521825 A | * | 6/2024 | |
| KR | 20210025741 A | * | 3/2021 | |
| WO | WO-2014014615 A1 | * | 1/2014 | B60L 53/12 |
| WO | WO-2015148678 A1 | * | 10/2015 | B60L 3/0023 |

OTHER PUBLICATIONS

Naoui Mohamed et al., A Comprehensive Analysis of Wireless Charging Systems for Electric Vehicles, IEEE Access, vol. 10, Apr. 18, 2022, 43865-43881.

* cited by examiner

WIRELESS CHARGING USAGE DETERMINATION SYSTEM, VEHICLE FOR SAME, AND ASSOCIATED METHOD

BACKGROUND

Some systems and methods for charging vehicles often yield imprecise charging usage calculations. For example, known systems and methods involve automatically charging inductive chargers of vehicles responsive to the inductive chargers being within a charging zone. This may provide an unsatisfactory charging user experience, which may have an adverse impact on, for example, the market for electric vehicles.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
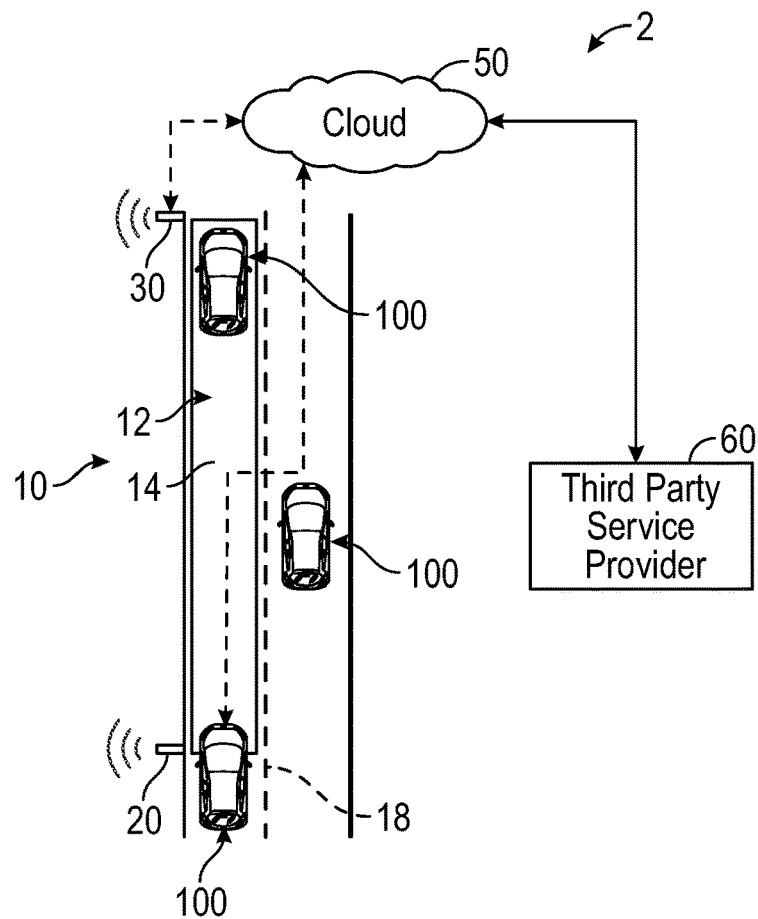
FIG. 1 is a simplified view of a wireless charging usage determination system, in accordance with one non-limiting embodiment of the disclosed concept.

The systems, apparatuses, and methods disclosed herein assist at least in part with wireless charging usage determinations and with accounting between a driver of a vehicle and a provider of wireless charging. In one example, a vehicle drives on a road and receives a wireless alert notification from a charging system, which includes a charging source having a road and an inductor coupled to the road. The alert notification may be in the form of an advertisement providing charging information to the vehicle, such as a cost per mile of usage. When a processor of the vehicle receives the wireless alert notification, a driver may form a contract with a provider of the charging system by interacting with a human to machine interface of the vehicle. When this is done, an inductive charger of the vehicle may be energized, thereby allowing a battery of the vehicle to be charged as the vehicle drives through a charging zone of the charging system. In one example, once the inductive charger is de-energized, the processor is configured to automatically send payment to a provider that operates the charging system, corresponding to an amount of the wireless charging usage.

In one embodiment, when the battery of the vehicle is being wirelessly charged in the charging zone, the system has a mechanism for reconciling disputes that may arise, such as between an owner of the vehicle and the provider of the charging system. For example, in a scenario where the owner believes he or she did not receive a charge in a charging zone, the system disclosed herein provides a mechanism to reconcile that dispute. More specifically, when the vehicle is driving on the road in the charging zone with an energized inductive charger, a camera of the vehicle may take snap-shots of the surrounding environment. These snap-shots, and snap-shots of charging usage may be stored in an unaltered block chain record to create a smart contract for any transaction reconciliation disputes, thereby allowing the owner and the provider of the charging system to determine if and how much the vehicle was in fact wirelessly charged.

Additionally, systems, apparatuses, and methods of the disclosed concept provide mechanisms for vehicles to reach a charging source more quickly for a wireless charge. For example, when a vehicle is driving, the vehicle may have a plurality of different routes to take to reach a corresponding plurality of different charging sources. The processor of the vehicle may receive real time information corresponding to an availability of different charging sources, a location of the charging sources, and a timing at which the inductive charger of the vehicle will be moved into the charging zone of the charging sources. Additionally, the processor may determine a preferred driving route for the vehicle to take for the inductive charger to be moved into one of the charging zones.

In another instance, the charging sources of the charging system are provided at an intersection, such as an intersection having a stoplight. When the vehicle is stopped at the stoplight at the intersection, a road-side unit of the charging system may send the wireless alert notification to the vehicle, and if the owner desires to have his or her vehicle charged, he or she can cause the inductive charger to be energized, thereby allowing the battery to be charged while the vehicle is waiting at the stoplight. When the light turns green, the vehicle can exit the charging zone of the charging source and automatically send payment to a provider that operates the charging system, corresponding to an amount of charge that has been provided to the vehicle.

In a further instance, while a vehicle is on the road, such as a highway, the vehicle may negotiate with another vehicle for a wireless charge. In such an instance, the other vehicle becomes a charging source. Thus, when the two vehicles are a predetermined distance from each other, one vehicle can receive a wireless charge from another vehicle.

Illustrative Embodiments

FIG. 1 shows a simplified view of a wireless charging usage determination system 2, in accordance with one non-limiting embodiment of the disclosed concept. As will be discussed below, the system 2 advantageously allows for wireless charging of vehicles to be determined in a relatively precise manner, thus allowing payment for vehicle charging to be relatively accurate, among other benefits. The system 2 includes a charging system 10 having a charging source 12 and a vehicle 100 configured to be charged by the charging source 12. While a charge may originate at smart infrastructure, or from a cloud, or from a charging service provider, it will be appreciated that a charging source in accordance with the disclosed concept 12 may be a source of energy that is configured to charge an inductive charger of a vehicle. Additionally, a third party service provider 60 may operate the charging system 10 and, in one example embodiment, may be an automobile company or a utility. Furthermore, wireless charging methodologies in accordance with the disclosed concept include, but are not limited to, inductive wireless charging, resonant inductive coupling, capacitive wireless charging, microwave charging, and light wave charging.

Figure 2:
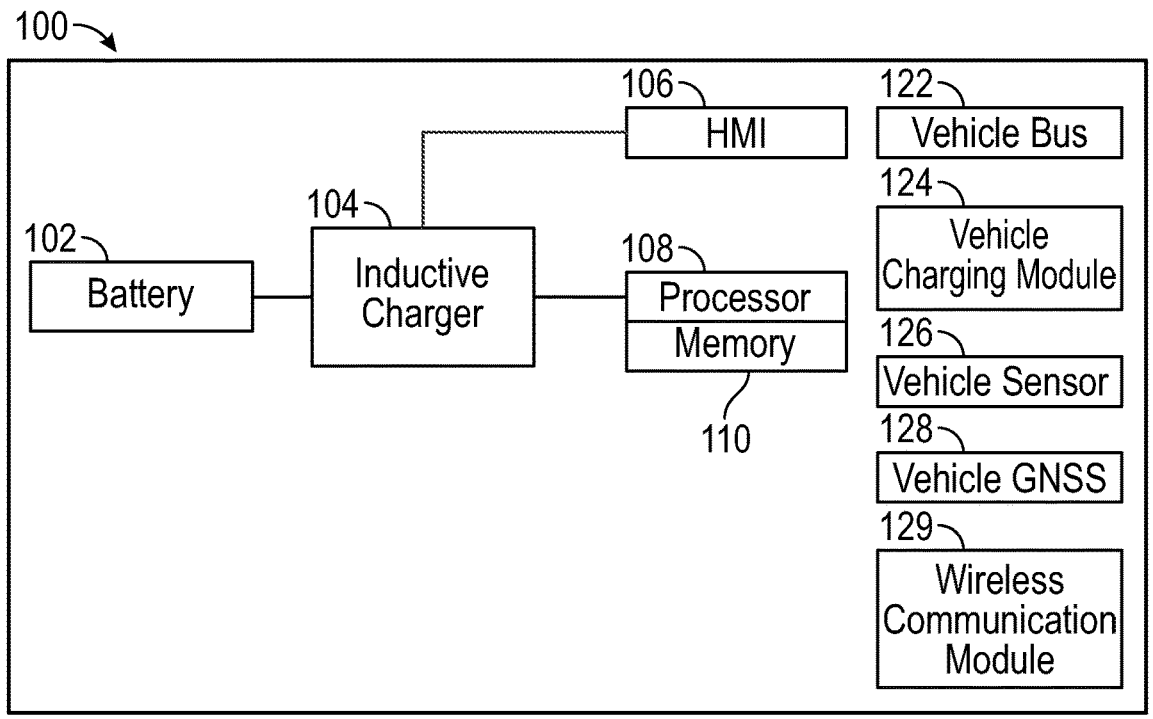
FIG. 2 is a simplified view of a vehicle for the system of FIG. 1.
Figure 3:
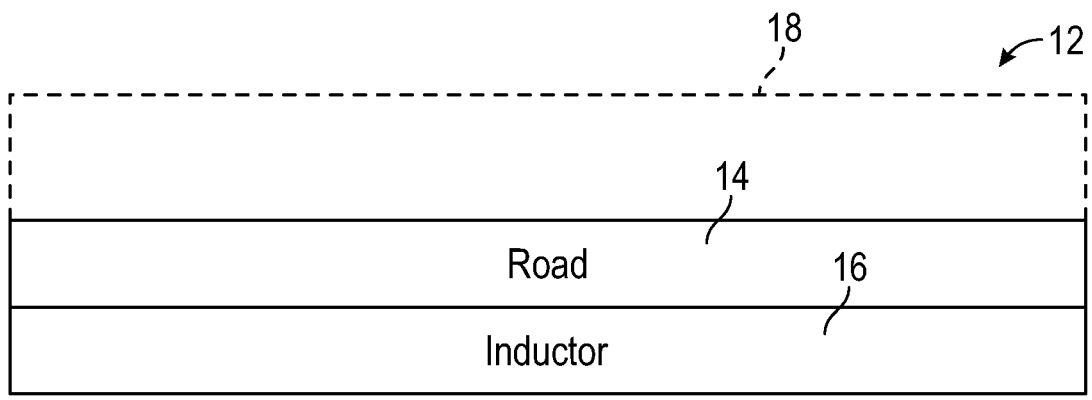
FIG. 3 is a simplified view of a charging source for the system of FIG. 1.

As stated above, the vehicle 100 is configured to be charged by the charging source 12. The vehicle 100, as shown in FIG. 2, includes a battery 102, an inductive charger 104 electrically connected to the battery 102, a human to machine interface (HMI) electrically connected to the inductive charger 104, a processor 108 electrically connected to the inductive charger 104, and a memory 110. As shown in FIG. 3, the charging source 12 includes a road 14 and an inductor 16 coupled to the road 14. The charging source 12 can thus be understood as having a charging zone 18 (shown in simplified form in FIG. 3) produced by the inductor 16. The charging zone 18 may define a boundary within which an inductive charger of a vehicle may receive a charge, and outside of which an inductive charger may not receive a charge. As a result, it will be appreciated that charging the vehicle 100 may be performed with the vehicle 100 driving in the charging zone 18 and on the road 14.

Additionally, and referring again to FIG. 1, the charging system 10 further has a number of road-side units 20,30 each located proximate or on the road 14. In one example embodiment, the road-side units 20,30 are configured to send wireless alert notifications to the processor 108 of the vehicle 100 via a cloud 50. These wireless alert notifications may present as advertisements corresponding to the availability of the charging source 12 to provide a charge to the vehicle 100, advertisements which include location-distance information (e.g., where the charging source 12 is located) and a charge rate (e.g., cost per mile). Accordingly, when the vehicle 100 is driving near (e.g., within a predetermined distance from one of the road-side units 20-30) or on the road 14, the road-side units 20,30 are configured to send the aforementioned wireless alert notifications.

In operation, the memory 110 of the vehicle includes instructions that, when executed by the processor 108, cause the processor to perform operations including receiving the wireless alert notifications from the road-side units 20,30, energizing the inductive charger 104 based on a response to the wireless alert notifications provided at the HMI 106, thereby charging the battery 102, determining wireless charging usage responsive to the inductive charger 104 being energized, and in one example embodiment, automatically sending payment to the third party service provider 60 that operates the charging system 10, corresponding to the wireless charging usage. Stated differently, the processor 108 receives the wireless alert notifications through the cloud 50, and when a user interacts with the HMI 106 (e.g., without limitation, manually presses a button and/or provides a voice command), the inductive charger 104 of the vehicle 100 becomes energized, thus allowing the battery 102 to be charged by the charging source 12. This is a relatively controlled manner of charging the vehicle 100 while the vehicle 100 is driving, as compared to the prior art.

More specifically, prior art vehicle wireless charging typically involves vehicles being automatically charged when moving into charging zones. However, in accordance with the disclosed concept, the vehicle may be in a charging zone and not receive a charge. However, if the user desires a controlled charge, the wireless alert notifications from the roadside units 20,30 and subsequent user actions to cause the inductive charger 104 to be energized advantageously control the amount of charge being provided to the battery 102. Further yet, determining how much charge has been received advantageously allows for accurate accounting between the recipient of the charge and the third party service provider 60. As such, the disclosed system 2 makes the wireless charging experience more desirable for customers, thereby having a desirable impact on the electric vehicle market.

In order to determine how much the owner of the vehicle 100 must pay for wirelessly charging the vehicle 100, the processor 108 determines wireless charging usage based in part on at least one of a position of the inductive charger 104 with respect to the charging zone 18 (e.g., whether the vehicle 100 is in the charging zone 18 or is in a non-charging zone), a speed of the vehicle 100, a length of time in which the inductive charger 104 has been energized, a rate of charge provided by the charging system 10, and a number of vehicle inputs. The vehicle inputs may include a vehicle bus 122 (FIG. 2) of the vehicle 100, a vehicle charging module 124 (FIG. 2) of the vehicle 100, a vehicle sensor 126 (FIG. 2) of the vehicle 100, and a vehicle global navigation satellite system (GNSS) 128 (FIG. 2) of the vehicle 100. Additionally, in one example embodiment the processor 108 determines wireless charging usage based in part on each of the aforementioned factors.

Regarding the vehicle inputs, the vehicle bus 122 may impact the speed of the vehicle 100, the PRNDL (Park, Reverse, Neutral, Drive, and Low) shifter, as well as the state of the ignition transmission. If proper information is not received from the vehicle bus 122, then the algorithm does a corresponding analysis and conveys to a customer that the vehicle 100 cannot wirelessly be charged. The vehicle charging module 124 may be responsible for charging the vehicle 100 and/or charging another vehicle. If the vehicle charging module 124 isn't functional or if a vehicle wireless communication module 129 (FIG. 2) is unable to receive rate information at the charging zone 18, it could report the same to the vehicle HMI and to the third-party service provider 60. The vehicle GNSS 128 may be employed to get a location of the vehicle 100, and a location relative to the vehicle 100 (e.g., determining if the vehicle 100 is in a charging lane and/or determining a route that has charging lanes, as will be discussed below). If the vehicle GNSS 128 is impacted with multipath, it may impact the precise localization for considering the wireless usage analysis for longer distance.

Figure 4:
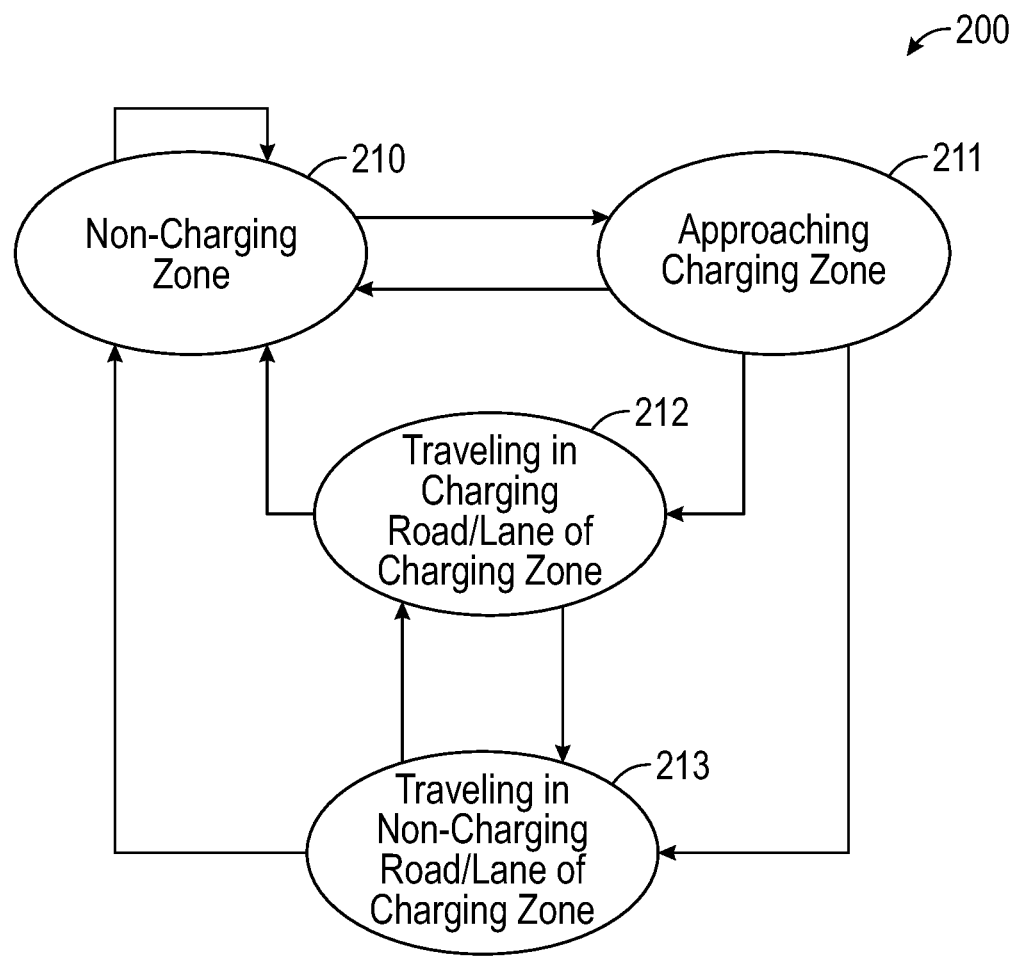
FIG. 4 is flow diagram showing how the vehicle of FIG. 2 could move with respect to the system of FIG. 1.

FIG. 4 shows a flow diagram 200 of possible movements of the vehicle 100 with respect to the system 2. As shown, between positions 210 and 211, the vehicle 100 is driving between a non-charging zone and a position where the vehicle 100 is approaching a charging zone. At position 211, it will be appreciated that the vehicle 100 might receive a wireless alert notification from a road-side unit 20,30 (FIG. 1) of a potential for an upcoming charge. This might occur when the vehicle 100 has moved to within a predetermined distance of one of the road-side units 20,30 (FIG. 1). Between positions 211 and 212, if the owner of the vehicle 100 accepts the advertisement for wireless charging (e.g., and thus energizes the inductive charger 104), the charging source 12 (FIGS. 1 and 3) can wirelessly charge the battery 102 of the vehicle 100. Between positions 211 and 213, this may correspond to the vehicle 100 driving through the charging zone 18 and not electing to energize the inductive charger 104, and as such not receiving a charge. Between positions 213 and 212, this may correspond to the vehicle 100 either being charged (when moving from position 213 to 212) or not being charged when in the charging zone 18 (when moving from position 212 to 213). Finally, when moving from position 213 to 210, and from 212 to 210, this corresponds to the vehicle 100 exiting the charging zone 18.

Figure 5:
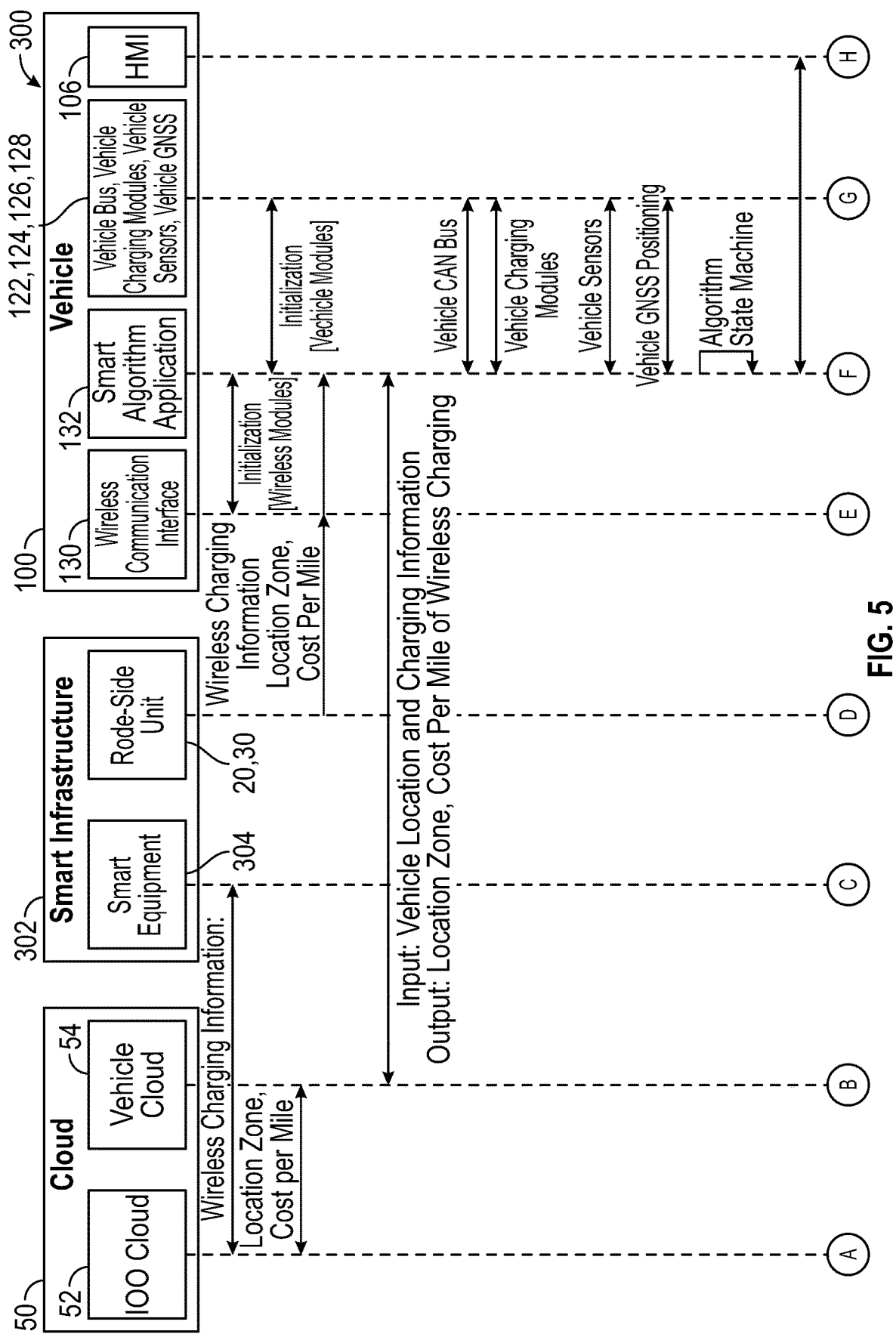
FIG. 5 is a sequence diagram corresponding to an algorithm employed with the system of FIG. 1.
Figure 5:
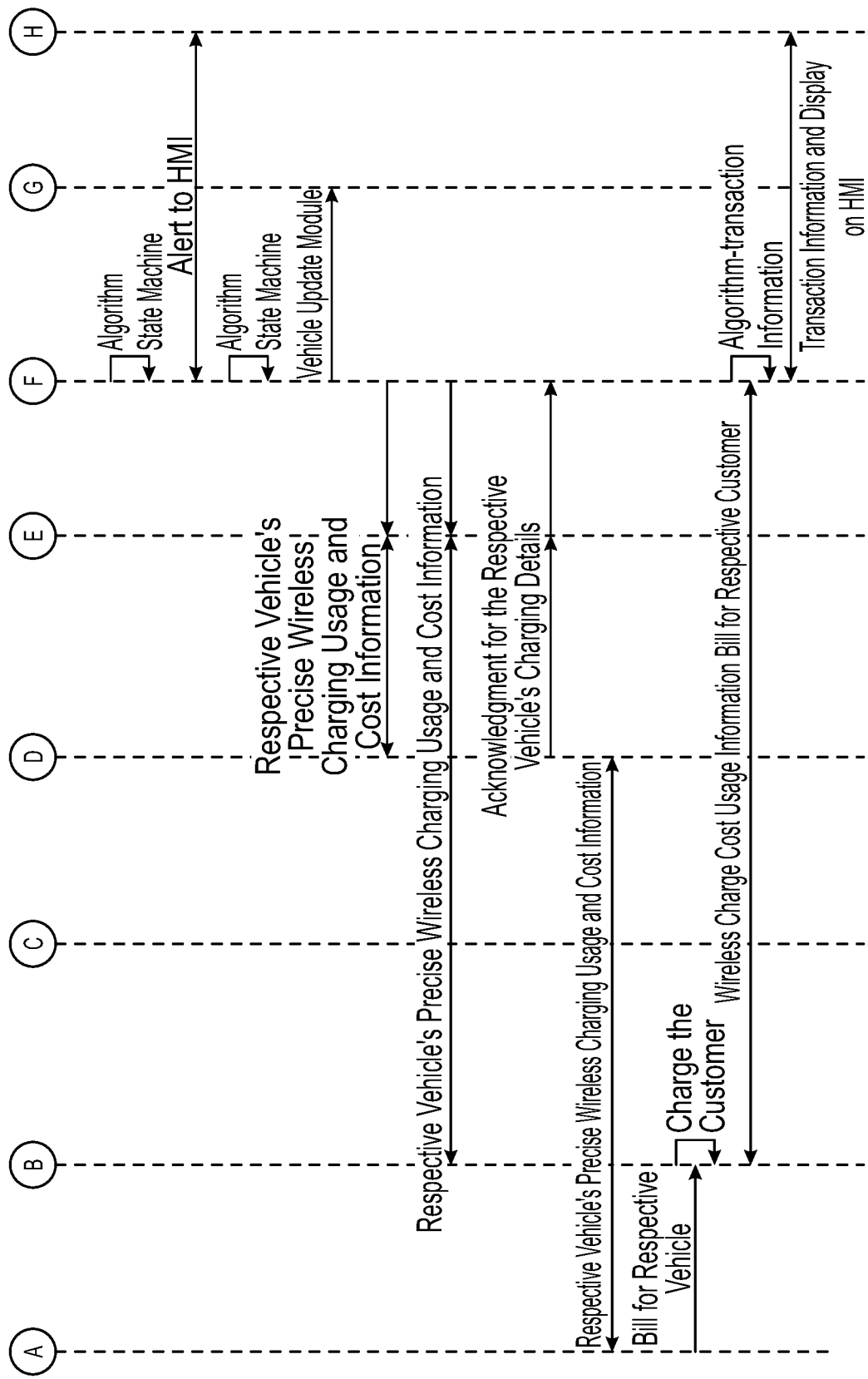

FIG. 5 shows an example sequence diagram 300 corresponding to an algorithm employed with the system 2 (FIG. 1). Shown as part of the system 2 are the cloud 50, the vehicle 100, and the smart infrastructure 302. The cloud 50 may include an IOO cloud 52 and a vehicle cloud 54. The vehicle 100 may further include a wireless communication interface 130 and a smart algorithm application 132. The smart infrastructure 302 for the system may include the road-side units 20,30 and smart equipment 304.

Accordingly, the processor 108 allows the vehicle 100 to energize the inductive charger 104, and when the vehicle 100 travels in the charging zone 18, the processor 108 initiates a calculation with a snap-shot (including location and time) as a proof of presence based on multiple vehicle factors (e.g., without limitation, speed, rate of charge reception, zone-distance). Additionally, whenever the vehicle 100 travels in non-charging zones (see position 213 in FIG. 4), the processor 108 stops the calculation and does predictive analysis, for example if the vehicle 100 is straddling a charging zone or alternatively based on the lane maneuvering of the vehicle 100. Moreover, at the end of the charging zone 18, the vehicle 100 has accumulated all the charging usage and broadcasts to the smart infrastructure 302 about the cost usage that the vehicle 100 owes for the charging usage transaction. In one example embodiment, the vehicle 100 does automatic payment for the precise wireless charging usage and shows to a customer a usage bill at the end of the respective trip. This may occur, for example, when the vehicle 100 moves from the charging zone 18 into a non-charging zone.

Figure 6:
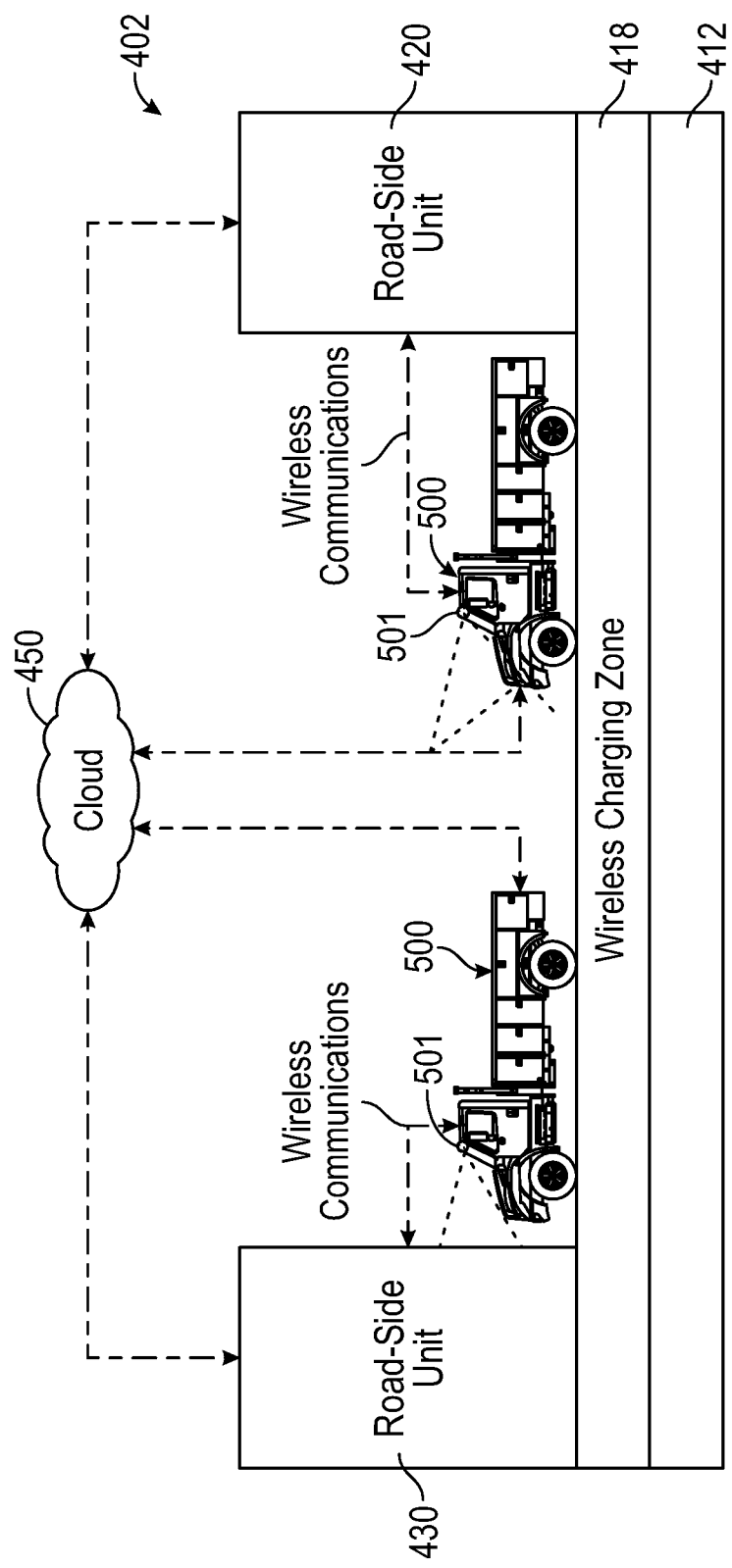
FIG. 6 is a simplified view of another wireless charging usage determination system, in accordance with another non-limiting embodiment of the disclosed concept.

FIG. 6 shows another wireless charging usage determination system 402, in accordance with another non-limiting embodiment of the disclosed concept. The system 402 is structured substantially the same as the system 2, and like features are represented by like numbers. Additionally, as shown, the vehicle 500 has a camera 501 (shown in simplified form) that is configured to take snap-shots of the surrounding environment. Accordingly, when the vehicle 500 is driving on the road 412 in the charging zone 418, and has an energized inductive charger (e.g., responsive to alert notifications being sent from the road-side units 420,430), snap-shots of charging usage and the vehicle surroundings (e.g., provided by the camera 501) are stored in an unaltered block chain record to create a smart contract for any transaction reconciliation disputes. Stated differently, the instructions of the memory of the vehicle 500, when executed by the processor of the vehicle 500, further cause the processor to perform operations including causing the camera 501 to take a snap-shot of a surrounding environment when the inductive charger is being energized, and storing information corresponding to the snap-shot and the wireless charging usage for transaction reconciliation disputes. As such, the vehicle exchanges the precise wireless charging usage via smart contract negotiation with the road-side units 420,430.

Figure 7:
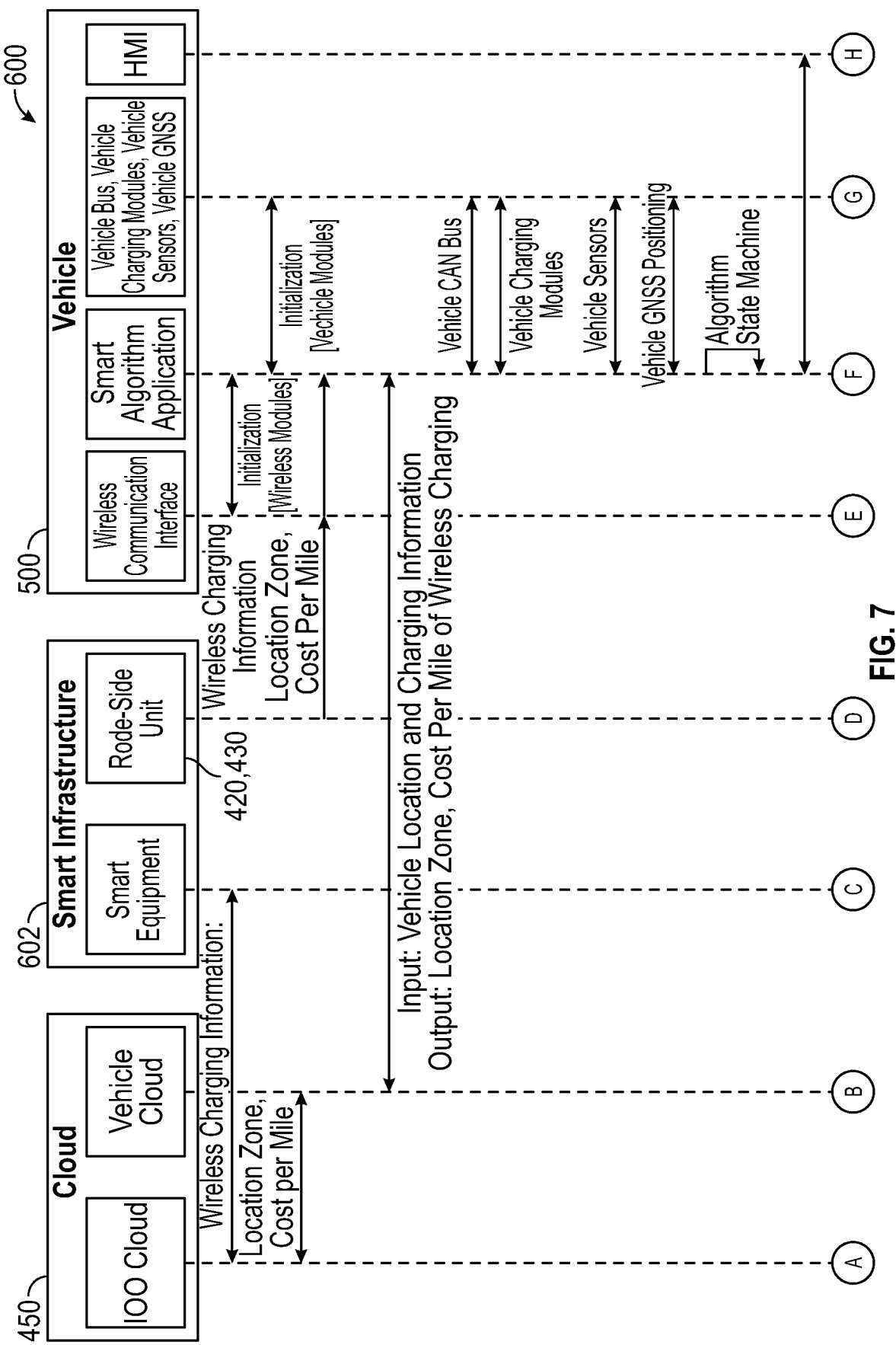
FIG. 7 is a sequence diagram corresponding to an algorithm employed with the system of FIG. 6.
Figure 7:
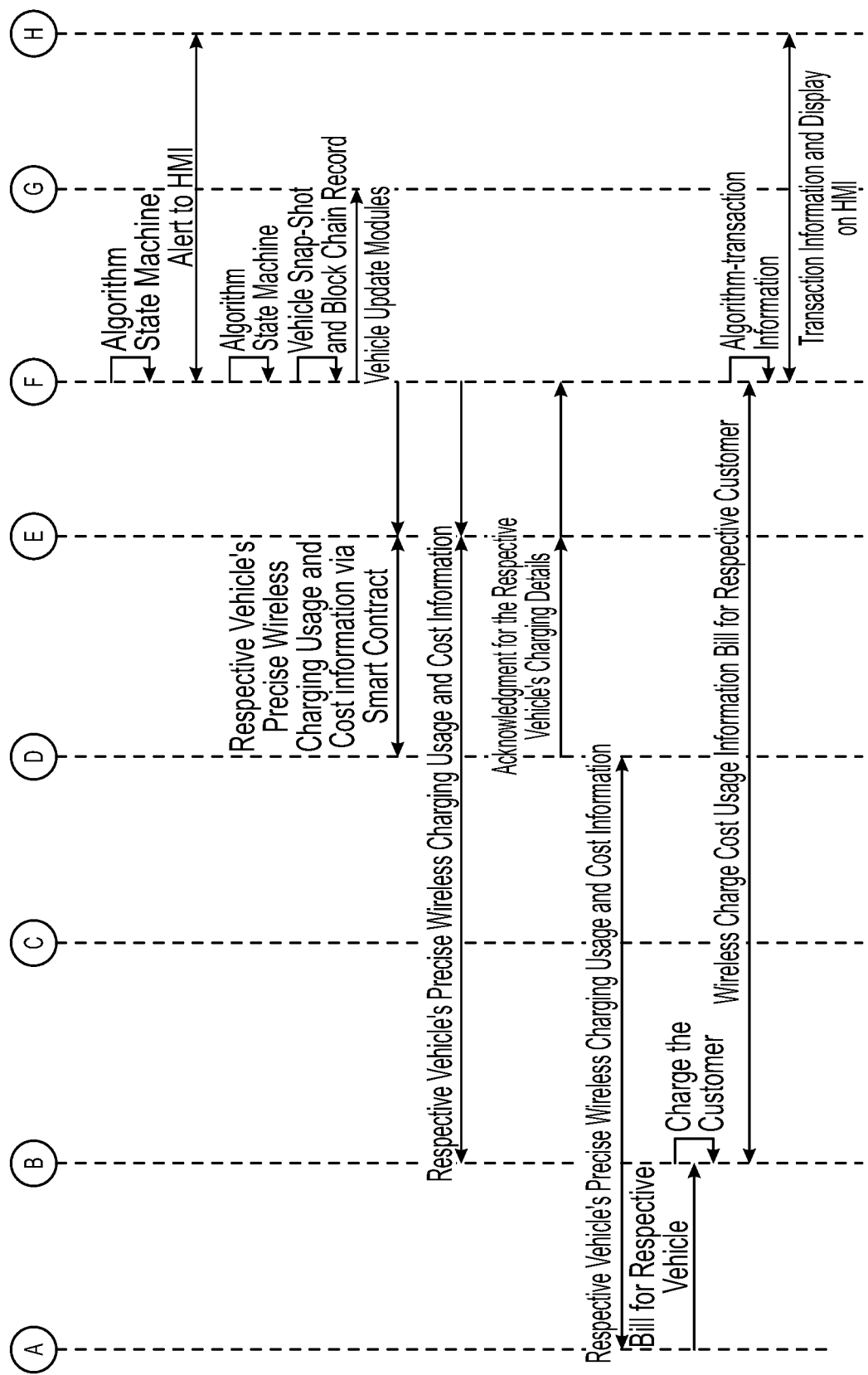

FIG. 7 shows an example sequence diagram 600 corresponding to an algorithm employed with the system 402 (FIG. 6). Shown as part of the system 402 are the cloud 450, the vehicle 500, and the smart infrastructure 602. The diagram 600 is substantially the same as the diagram 300 (FIG. 5), except for the additional inputs particular to the system 402. These inputs are: a) the vehicle snap-shot and block chain record; and b) respective vehicle's precise wireless charging usage and cost information via smart contract.

Figure 8:
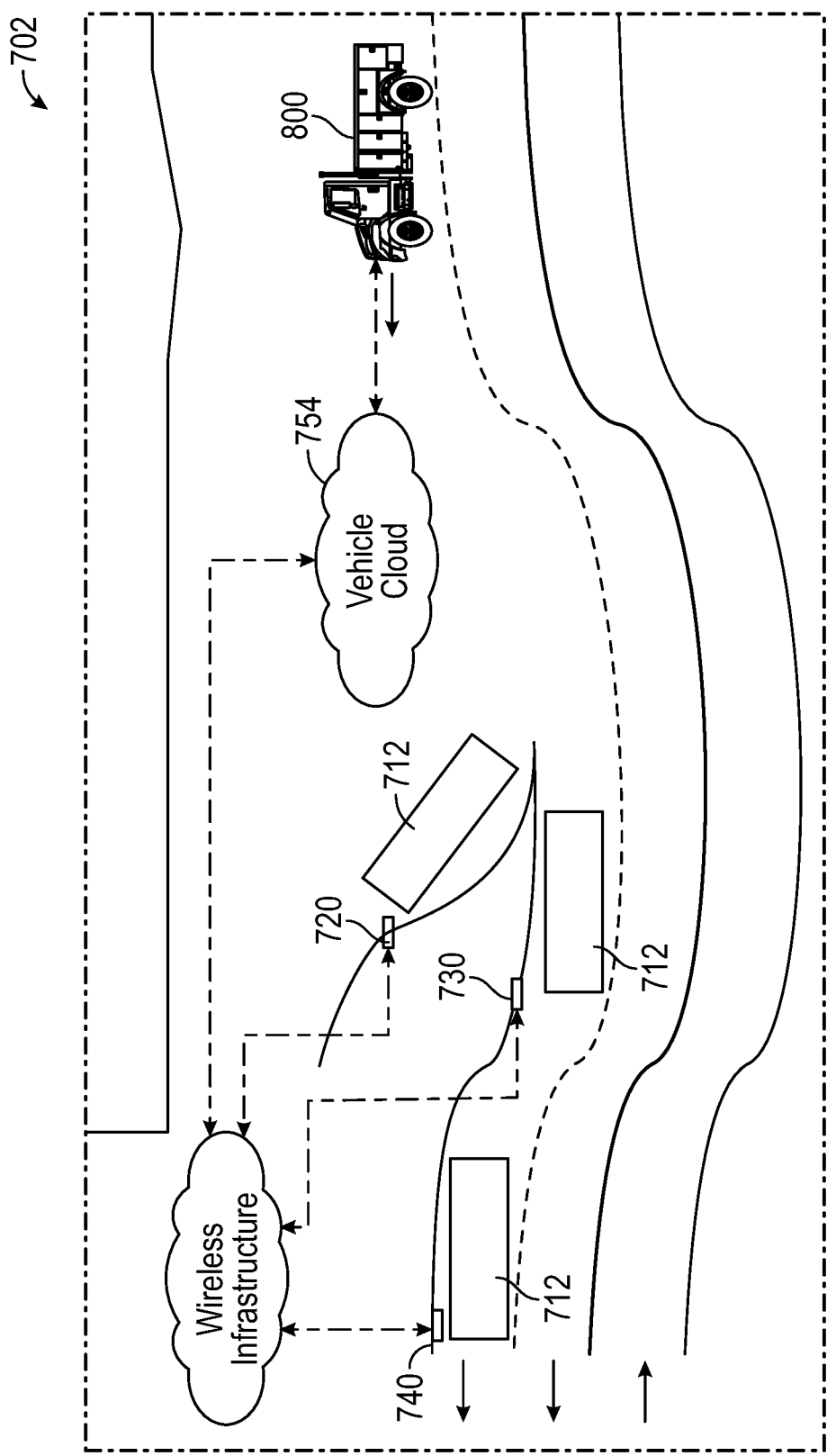
FIG. 8 is a simplified view of another wireless charging usage determination system, in accordance with another non-limiting embodiment of the disclosed concept.

FIG. 8 shows another wireless charging usage determination system 702, in accordance with another non-limiting embodiment of the disclosed concept. The system 702 is substantially the same as the systems 2,402, discussed above, and like numbers represent like features. As shown, the vehicle 800 is driving and is spaced a distance from a number of different charging sources 712. It will be appreciated that the instructions of the memory of the vehicle 800, when executed by the processor of the vehicle 800, further cause the processor to perform operations including receiving real time information corresponding to an availability of the charging sources 712, a location of the charging sources 712, and a timing at which the inductive charger of the vehicle 800 will be moved into the charging zone of the charging sources 712; and determining a preferred driving route for the vehicle 800 to take for the inductive charger to be moved into one of the charging zones of one of the charging sources 712.

Stated differently, the vehicle 800 employs the vehicle GNSS 828 (FIG. 9) to determine a preferred route to a preferred one of the charging sources 712. This is desirable for drivers who do not know where certain of the charging sources 712 are, and who do not know what the best routes are to reach those charging sources 712. The processor of the vehicle 800 may account for information including the current charge status of the vehicle 800, the distance to each of the charging sources 712, and the time it would take to reach them. In this manner, the vehicle 800 can advantageously be guided to a preferred one of the charging sources 712 for wireless charging. Additionally, based on the current charging availability of the vehicle 800, the processor of the vehicle 800 may employ the GNSS 828 to determine detour routes so that the vehicle 800 is not delayed in reaching the end destination.

Figure 9:
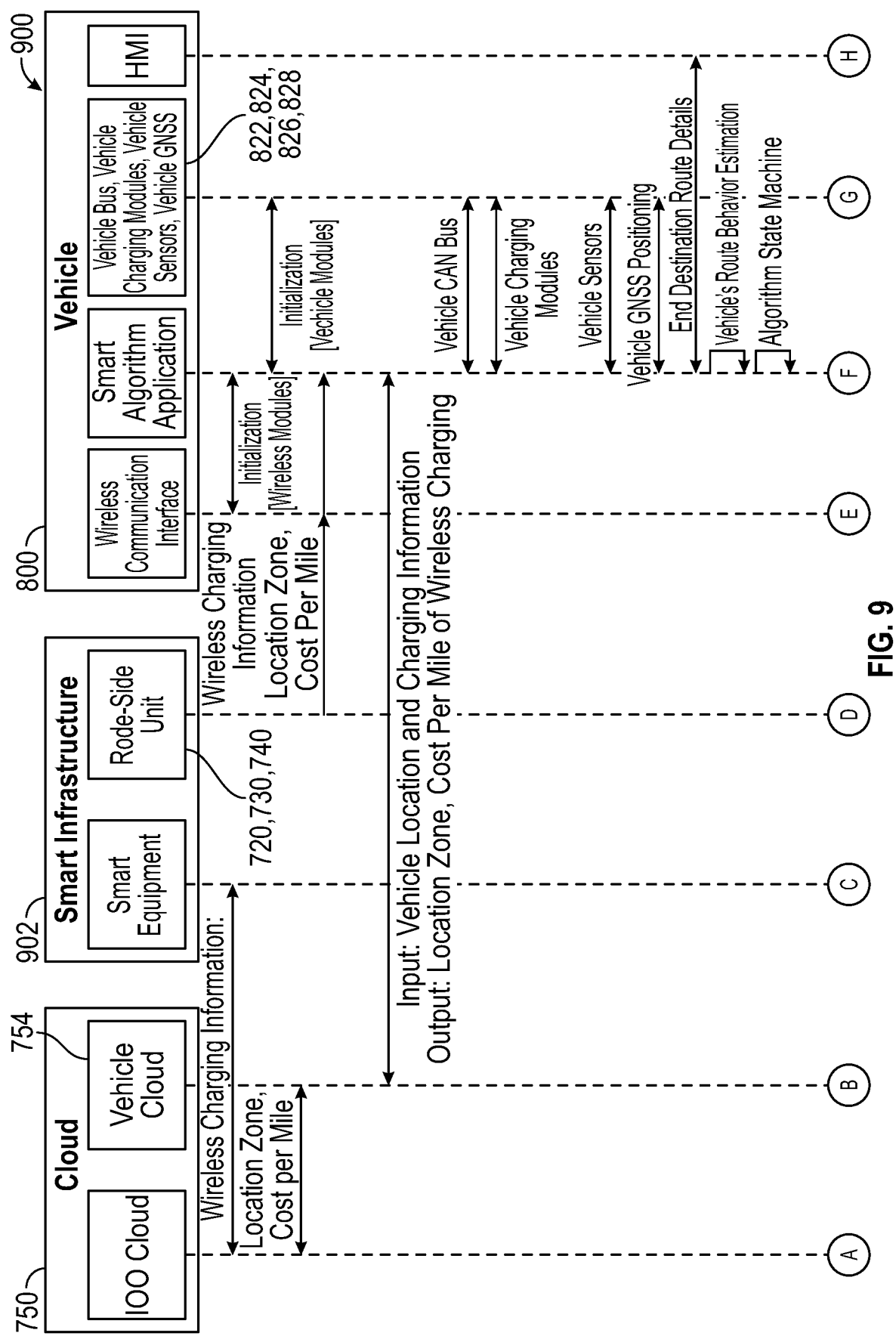
FIG. 9 is a sequence diagram corresponding to an algorithm employed with the system of FIG. 8.
Figure 9:
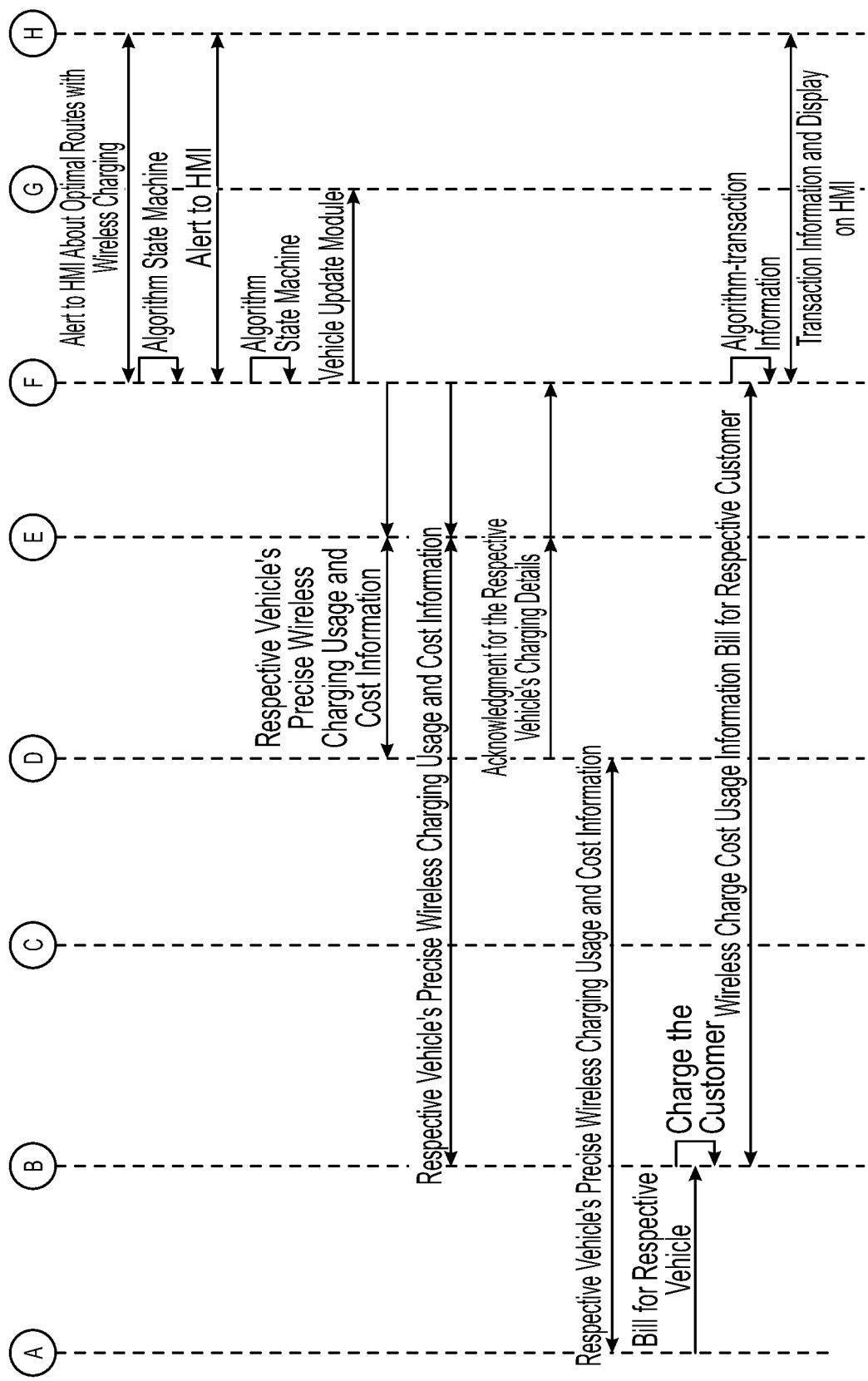

FIG. 9 shows an example sequence diagram 900 corresponding to an algorithm employed with the system 702 (FIG. 8). Shown as part of the system 702 are the cloud 750 including the vehicle cloud 754, the vehicle 800 including the inputs 822,824,826,828, and the smart infrastructure 902 including the road-side units 720,730,740. The diagram 900 is substantially the same as the diagram 300 (FIG. 5), except for the additional inputs of: a) end destination route details; b) vehicle's route behavior estimation; and c) alert to the HMI about optimal routes with wireless charging.

Figure 10:
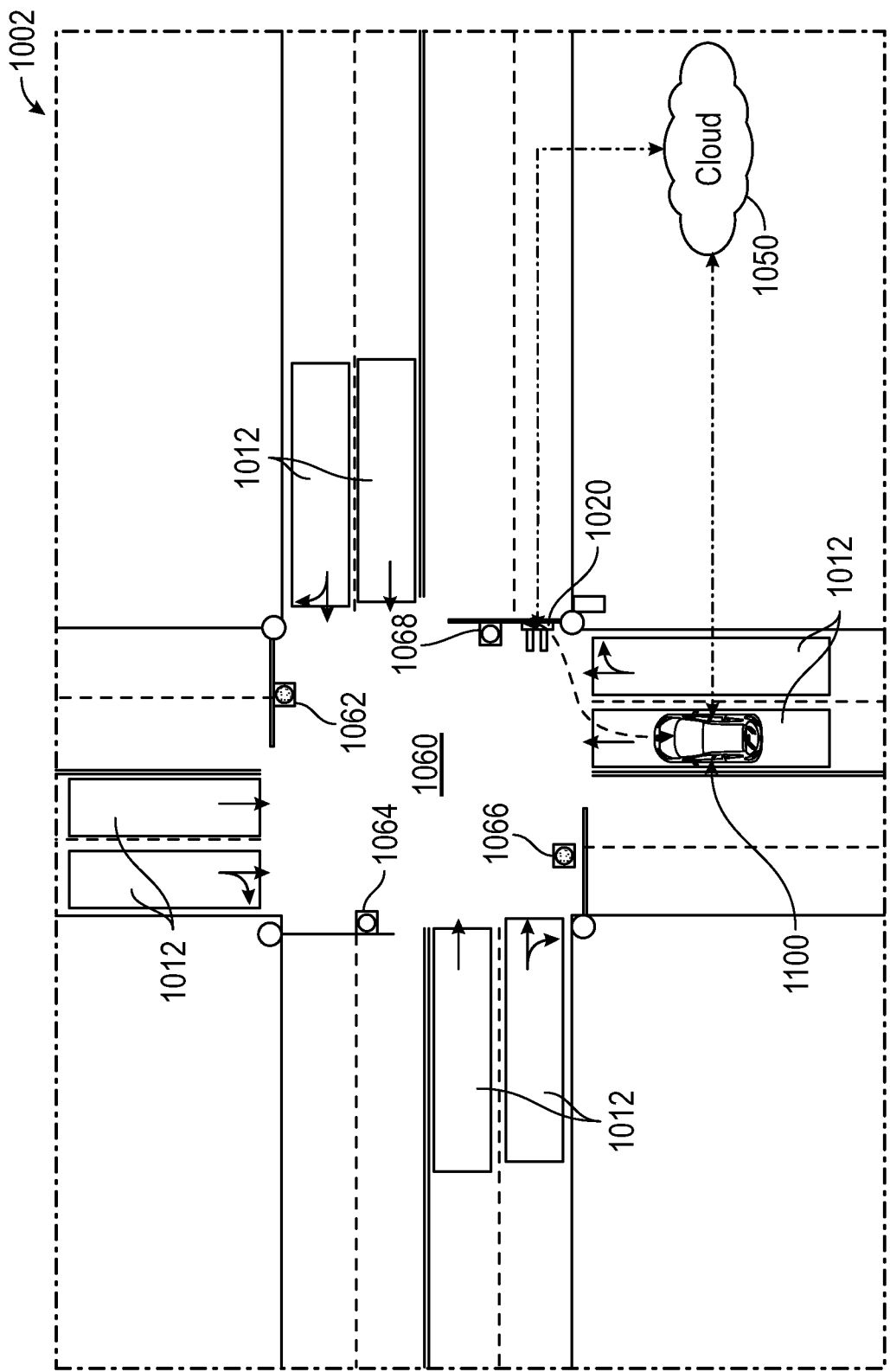
FIG. 10 is a simplified view of another wireless charging usage determination system, in accordance with another non-limiting embodiment of the disclosed concept.

FIG. 10 shows another wireless charging usage determination system 1002, in accordance with another non-limiting embodiment of the disclosed concept. The system 1002 is substantially the same as the systems 2,402,702 discussed above, and like numbers represent like features. As shown, the charging sources 1012, which include the road and the inductor, are provided at an intersection 1060 having a number of stoplights 1062,1064,1066,1068. Additionally, the road-side unit 1020 is also provided at the intersection 1060. Accordingly, it will be appreciated that when the vehicle 1100 approaches the intersection 1060 and stops at the stoplight 1062, a wireless alert notification corresponding to charging availability may be sent from the road-side unit 1020 to the processor of the vehicle 1100. A "stop" at a stoplight may include the speed of the vehicle 1100 being zero, the brakes of the vehicle 1100 being engaged, and/or no undesirable alert being displayed on the HMI of the vehicle 1100. A wireless alert notification may also be sent as the vehicle is stopping.

Accordingly, the vehicle 1100 may then be wirelessly charged while waiting at the stoplight 1062, and then upon the stoplight 1062 turning green, the vehicle 1100 could exit the charging zone of the charging source 1012, and automatically pay for said charging usage. It is also contemplated that while the vehicle 1100 is being wirelessly charged at the intersection 1060, the road-side unit 1020 could send another wireless alert notification to the processor of the vehicle 1100 to inform the driver that it is time to start driving (e.g., and that the charging period is about to end). In one example, the road-side unit 1020 may also record a snap-shot of the vehicle 1100 for transaction reconciliation disputes.

Figure 11:
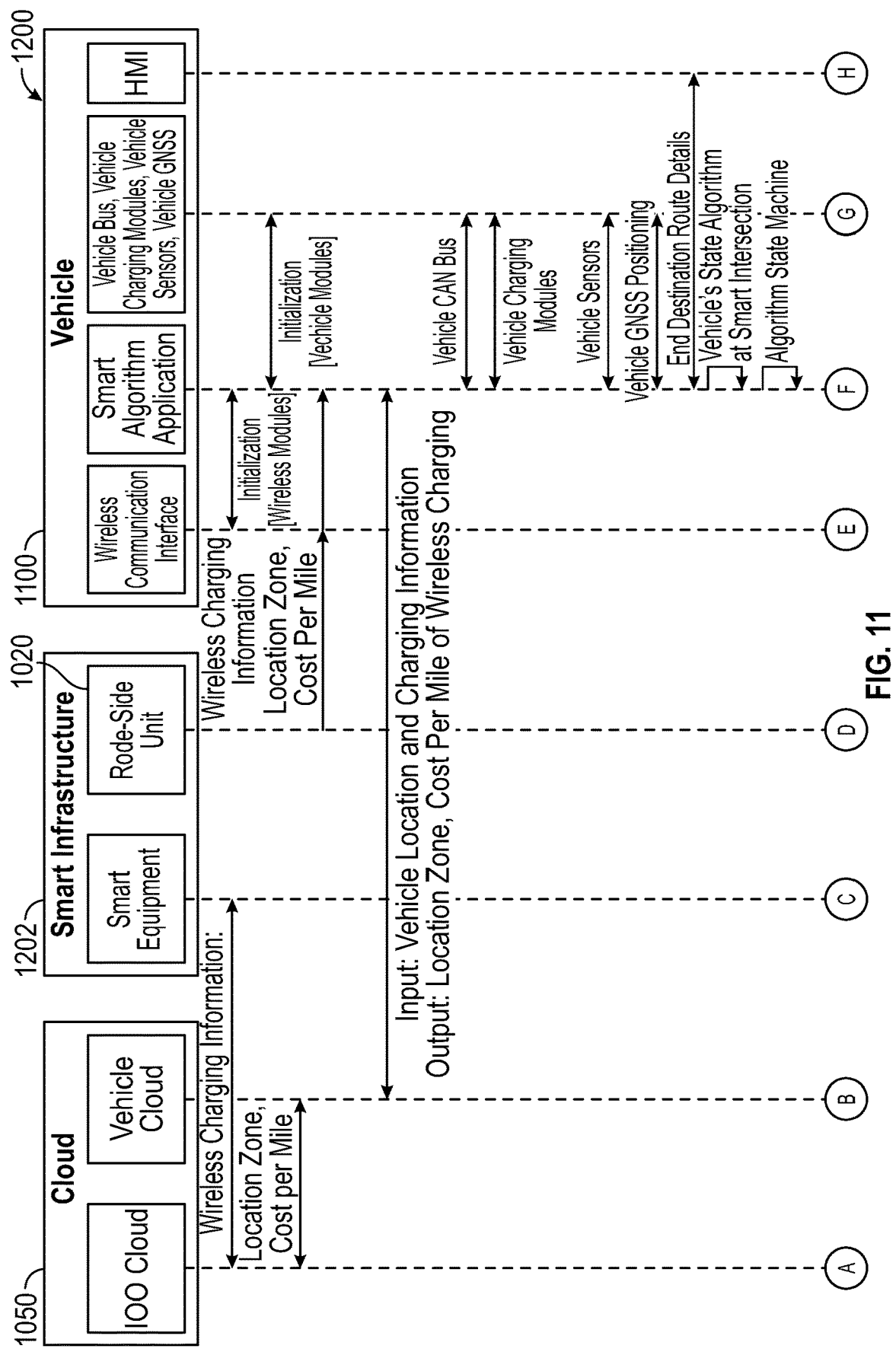
FIG. 11 is a sequence diagram corresponding to an algorithm employed with the system of FIG. 10.
Figure 11:
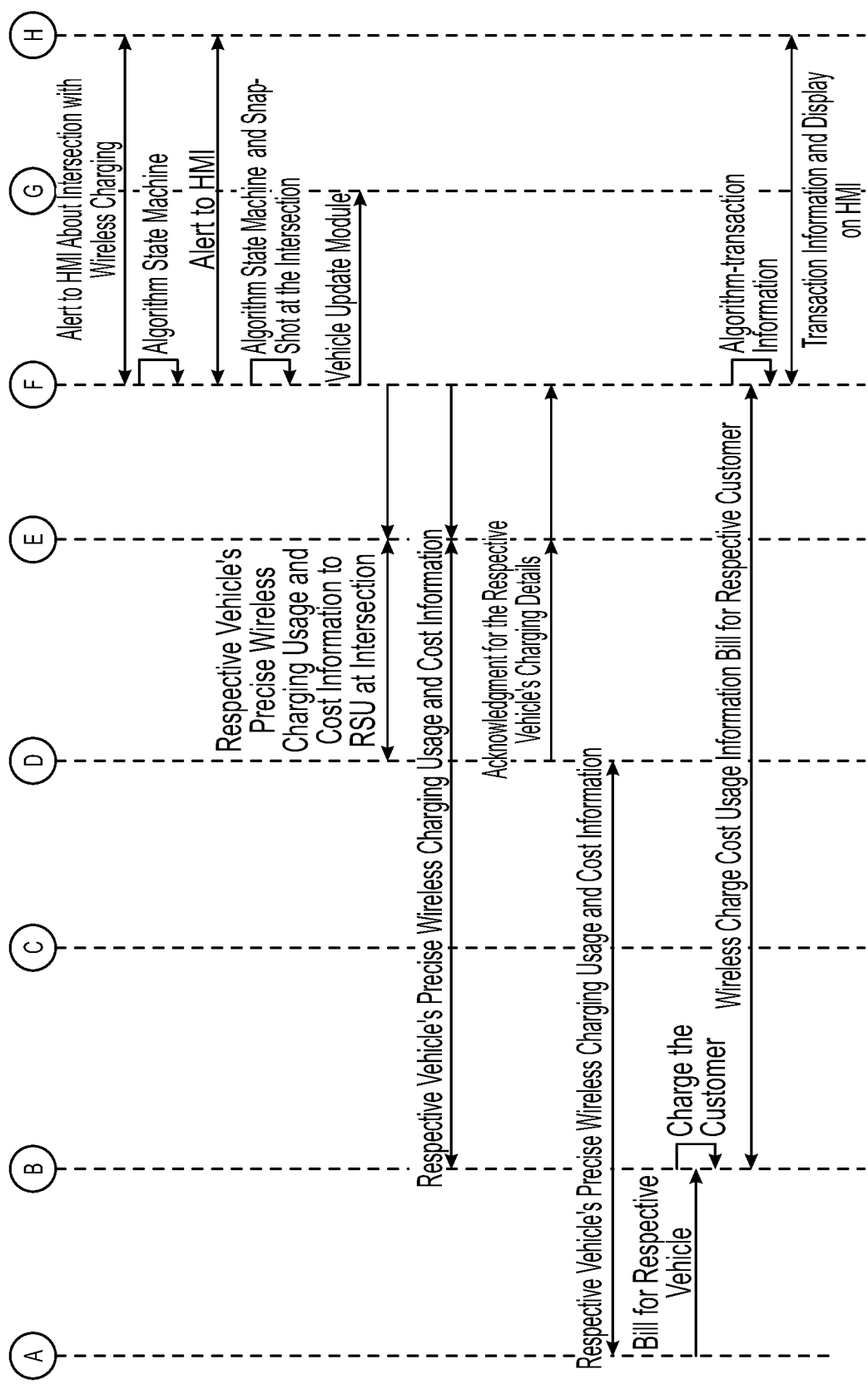

FIG. 11 shows an example sequence diagram 1200 corresponding to an algorithm employed with the system 1002 (FIG. 8). Shown as part of the system 1002 are the cloud 1050, the vehicle 1100, and the smart infrastructure 1202 including the road-side unit 1020. The diagram 1200 is substantially the same as the diagram 300 (FIG. 5), except for the additional inputs of: a) end destination route details; b) vehicle state algorithm at smart intersection; c) alert to HMI about intersection with wireless charging; d) algorithm state machine and snap-shot at the intersection; and e) respective vehicle's precise wireless charging usage and cost information to road-side unit at intersection.

Figure 12:
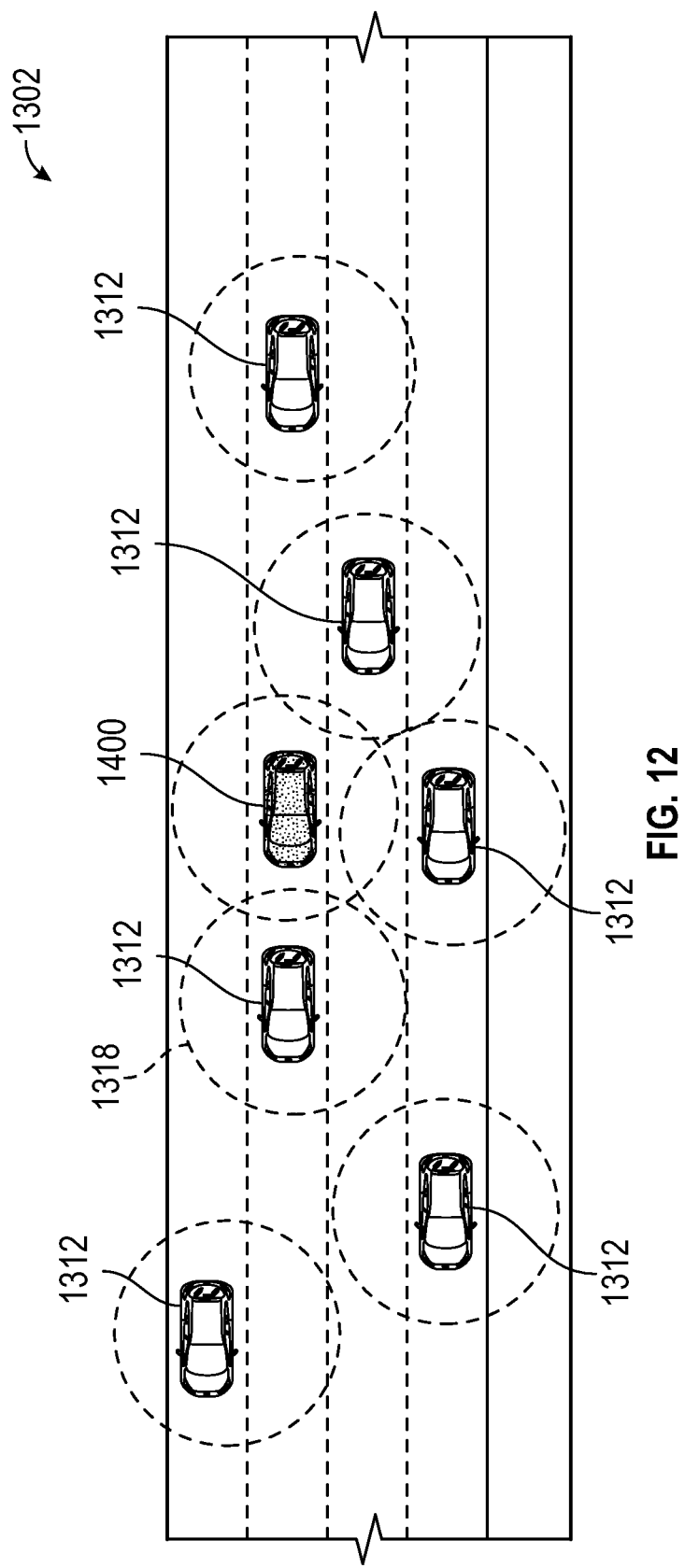
FIG. 12 is a simplified view of another wireless charging usage determination system, in accordance with another non-limiting embodiment of the disclosed concept.

FIG. 12 shows another wireless charging usage determination system 1302, in accordance with another non-limiting embodiment of the disclosed concept. The system 1302 is substantially the same as the systems 2,402,702,1002 discussed above, and like numbers represent like features. As shown, the vehicle 1400 is driving on a road. It is contemplated that the system 1302 may be desirable during high traffic situations, or when a vehicle is stranded. Additionally, in the example of FIG. 12, the charging sources are in the form of other vehicles 1312. When the vehicle 1400 is in the charging zone 1318 and the inductive charger of the vehicle 1400 is energized, it will be appreciated that the battery of the vehicle 1400 can be charged from the battery of the other vehicle 1312. Wireless alert notifications in accordance with the instant embodiment can be sent either by the other vehicles 1312 or by the vehicle 1400. As such, the driver of the vehicle 1400, if he or she determines that the battery needs a charge, can cause the processor of the vehicle 1400 to send a wireless alert notification (e.g., such that the vehicle 1400 may be in a charge-needed mode) to the other vehicles 1312. Alternatively, the other vehicles 1312 can advertise charging capabilities in substantially the same manner as the road-side units 20,30, discussed above.

Figure 13:
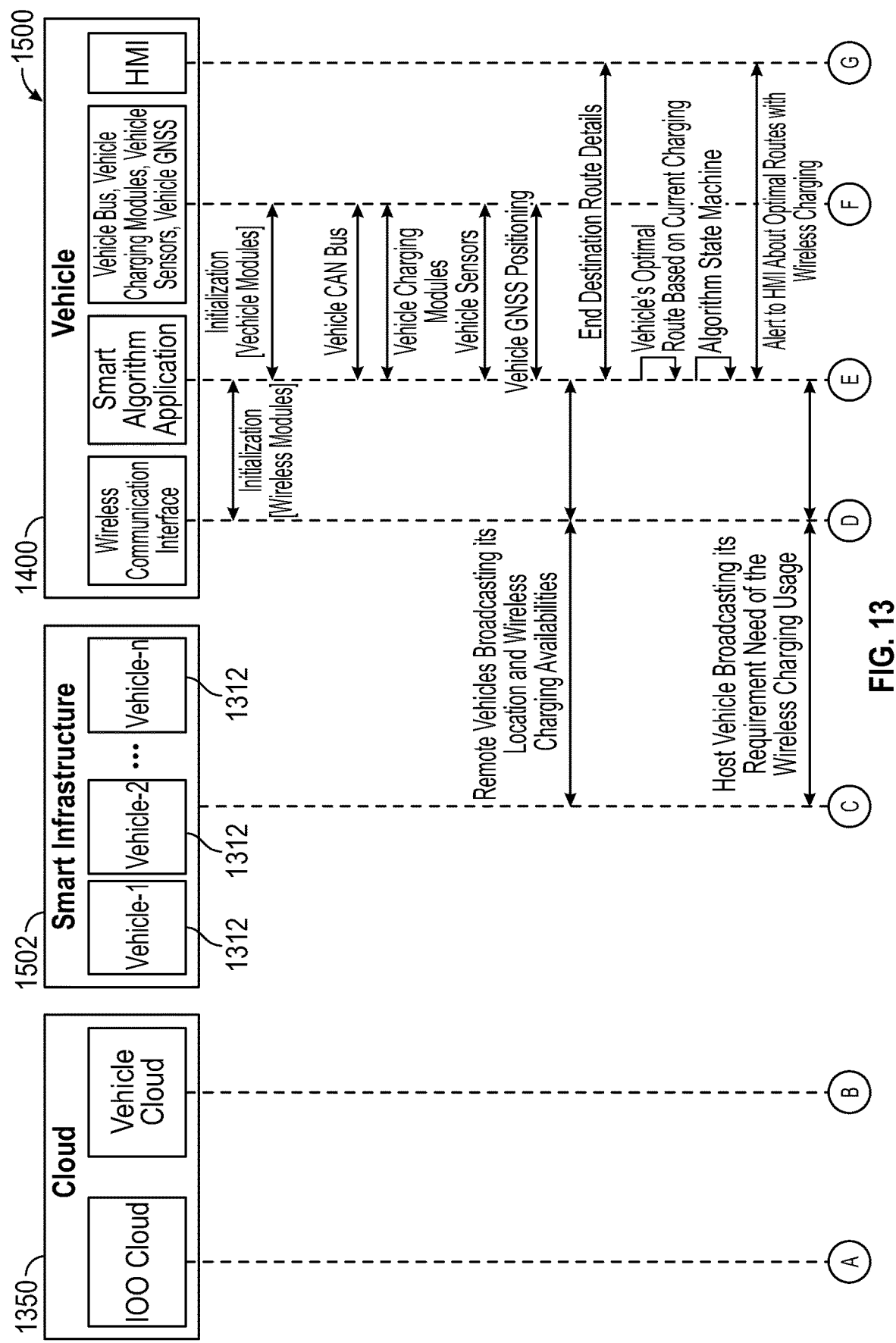
FIG. 13 is a sequence diagram corresponding to an algorithm employed with the system of FIG. 12.
Figure 13:
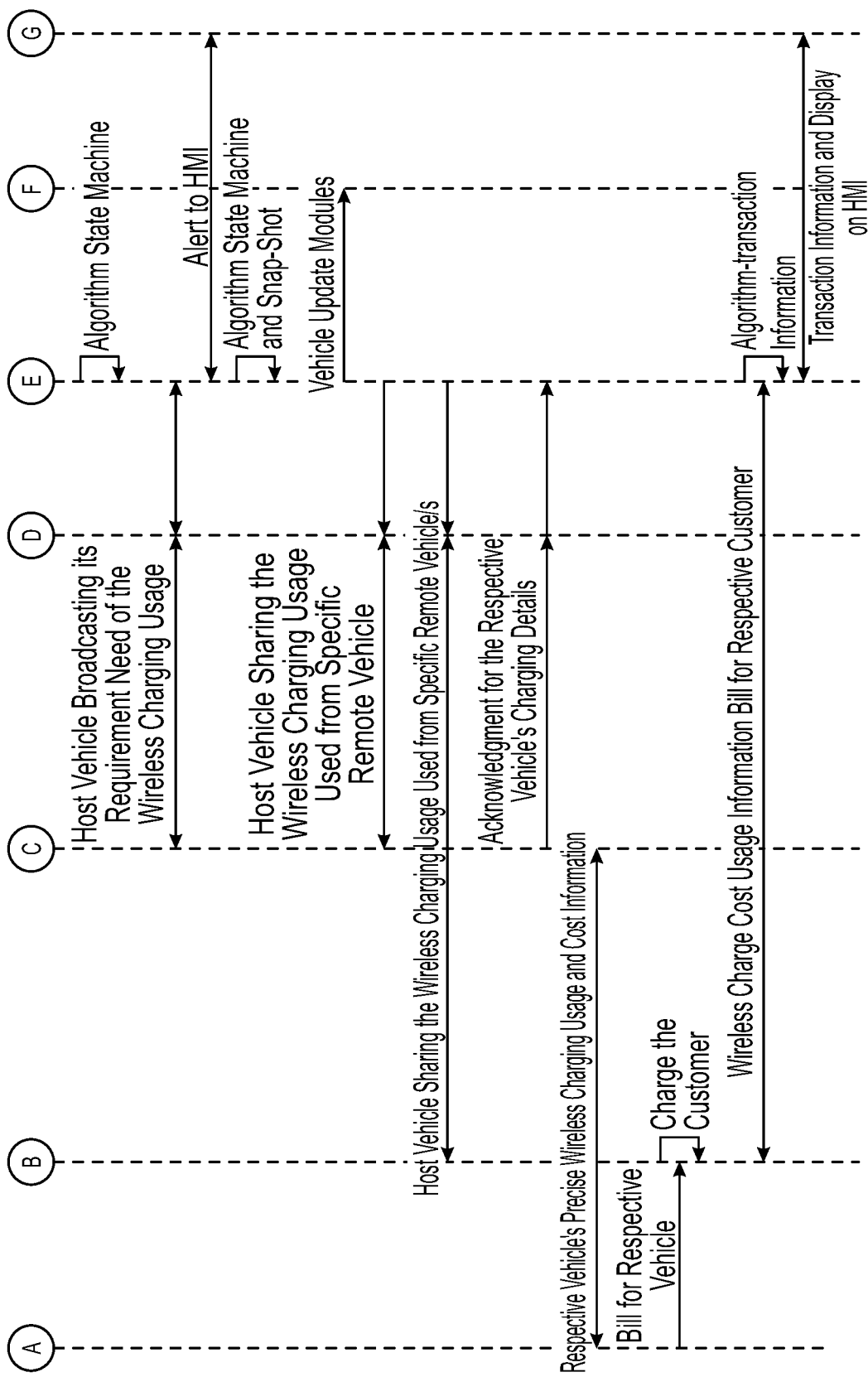

FIG. 13 shows an example sequence diagram 1500 corresponding to an algorithm employed with the system 1302 (FIG. 12). Shown as part of the system 1302 are the cloud 1350, the vehicle 1400, and the smart infrastructure 1502 including the other vehicles 1312. The diagram 1500 is like the diagram 300 (FIG. 5), but with some modification to account for employing other vehicles 1312 as the charging sources.

Figure 14:
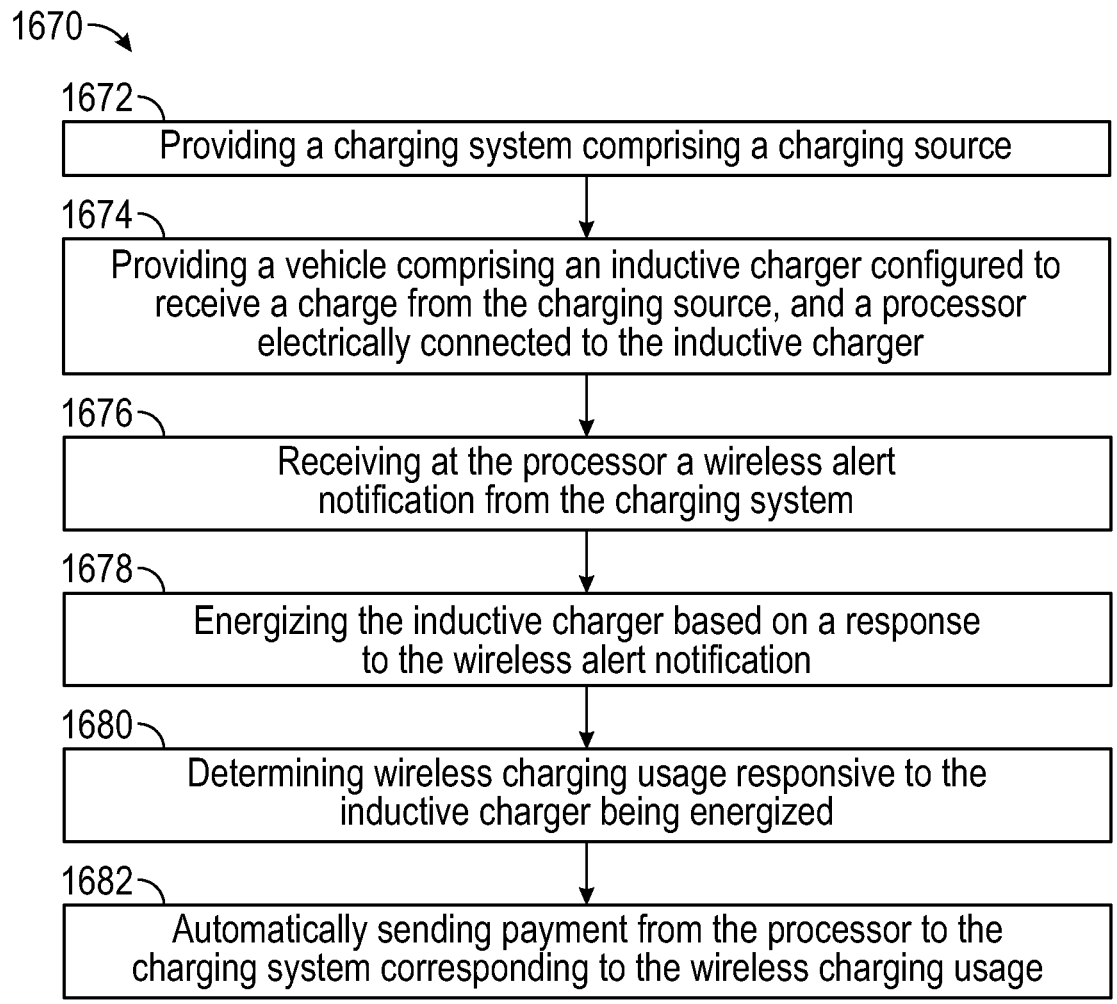
FIG. 14 is a flow diagram corresponding to a method in which embodiments of the disclosed concept are employed.

FIG. 14 shows an example method 1670 of determining wireless charging usage. The method 1670 includes a first step 1672 of providing a charging system 2,402,702,1002, 1302 including a charging source 12,412,712,1012,1312, a second step 1674 of providing a vehicle 100,500,800,1100, 1400 including an inductive charger 104 configured to receive a charge from the charging source, 12,412,712,1012, 1312, and a processor 108 electrically connected to the inductive charger 104. The method 1670 may further include a third step 1676 of receiving at the processor 108 a wireless alert notification from the charging system 10, a fourth step 1678 of energizing the inductive charger 104 based on a response to the wireless alert notification, a fifth step 1680 of determining wireless charging usage responsive to the inductive charger 104 being energized, and optionally a sixth step 1682 of automatically sending payment from the processor 108 to a third party provider that operates the charging system 10, corresponding to the wireless charging usage. Additionally, energizing the inductive charger 104 may be performed with the vehicle 100,500,800,1100,1400 moving at a speed greater than zero.

Accordingly, it will be appreciated that the disclosed concept provides for a new (e.g., better able to determine and account for wireless charging usage) wireless charging usage determination system 2,402,702,1002,1302, vehicle 100,500,800,1100,1400 for the same, and associated method, in which wireless alert notifications are sent to the processor 108 of the vehicles 100,500,800,1100,1400, and in response to an inductive charger 104 being energized, the vehicles 100,500,800,1100,1400 are able to be wirelessly charged. Furthermore, precise wireless charging usage determinations are advantageously able to be made by the processors 108, thereby allowing for relatively accurate accounting (e.g., payment by the owner of the vehicles 100,500,800,1100,1400).

It will be appreciated that the vehicles 100,500,800,1100, 1312,1400 may take the form of a passenger or commercial automobile such as, for example, a performance vehicle, a car, a truck, a crossover vehicle, a sport utility vehicle, a van, a minivan, a taxi, a bus, etc., and may be configured and/or programmed to include various types of automotive drive systems. Additionally, in one example embodiment, the vehicles 100,500,800,1100,1312,1400 may be configured as electric vehicles (EVs). More particularly, the vehicles 100, 500,800,1100,1312,1400 may include a battery EV (BEV) drive system or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicles 100,500,800,1100,1312, 1400 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicles 100,500,800,1100,1312,1400 may be manually driven vehicles, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

Additionally, the processor 108 of the vehicle 100, and the processors of the other 500,800,1100,1312,1400 may be commercially available general-purpose processors, such as a processor from the Intel® or ARM® architecture families. The memory 110 of the vehicle 100, and the memories of the other vehicles 500,800,1100,1312,1400, may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A wireless charging usage determination system, comprising:
a charging system comprising a charging source; and
a vehicle comprising an inductive charger configured to receive a charge from the charging source, a processor electrically connected to the inductive charger, and a memory comprising instructions that, when executed by the processor, cause the processor to perform operations comprising:
receiving a wireless alert notification from the charging system;
energizing the inductive charger based on a response to the wireless alert notification; and
determining wireless charging usage responsive to the inductive charger being energized.

2. The system according to claim 1, wherein the instructions, when executed by the processor, further cause the processor to perform the operation comprising:
automatically sending payment to a provider that operates the charging system, corresponding to the wireless charging usage.

3. The system according to claim 1, wherein the charging source has a charging zone, and wherein determining wireless charging usage is based in part on at least one of a position of the inductive charger with respect to the charging zone, a speed of the vehicle, a length of time in which the inductive charger has been energized, and a rate of charge provided by the charging system.

4. The system according to claim 3, wherein determining wireless charging usage is based in part on each of the position of the inductive charger with respect to the charging zone, the speed of the vehicle, the length of time in which the inductive charger has been energized, and the rate of charge provided by the charging system.

5. The system according to claim 3, wherein determining wireless charging usage is further based on a number of vehicle inputs comprising a vehicle bus, a vehicle charging module, a vehicle sensor, and a vehicle global navigation satellite system.

6. The system according to claim 1, wherein the charging source comprises a road and an inductor coupled to the road.

7. The system according to claim 6, wherein the road is provided at an intersection having a stoplight.

8. The system according to claim 6, wherein the charging system further comprises a road-side unit disposed proximate the road, and wherein the road-side unit is configured to send the wireless alert notification to the processor.

9. The system according to claim 1, wherein the charging source is another vehicle.

10. The system according to claim 1, wherein the vehicle further comprises a camera, and wherein the instructions, when executed by the processor, further cause the processor to perform operations comprising:
causing the camera to take a snap-shot of a surrounding environment when the inductive charger is being energized; and
storing information corresponding to the snap-shot and the wireless charging usage for transaction reconciliation disputes.

11. The system according to claim 1, wherein the charging source has a charging zone, and wherein the instructions, when executed by the processor, further cause the processor to perform operations comprising:
receiving real time information corresponding to an availability of the charging source, a location of the charging source, and a timing at which the inductive charger will be moved into the charging zone; and
determining a preferred driving route for the vehicle to take for the inductive charger to be moved into the charging zone.

12. A vehicle for a wireless charging usage determination system, the wireless charging usage determination system comprising a charging system including a charging source, the vehicle comprising:
a battery;
an inductive charger electrically connected to the battery and configured to receive a charge from the charging source;
a human to machine interface electrically connected to the inductive charger;
a processor electrically connected to the inductive charger, and
a memory comprising instructions that, when executed by the processor, cause the processor to perform operations comprising:
receiving a wireless alert notification from the charging system;
energizing the inductive charger based on a response to the wireless alert notification provided at the human to machine interface, thereby charging the battery; and
determining wireless charging usage responsive to the inductive charger being energized.

13. The vehicle according to claim 12, wherein the charging source has a charging zone, and wherein determining wireless charging usage is based in part on at least one of a position of the inductive charger with respect to the charging zone, a speed of the vehicle, a length of time in which the inductive charger has been energized, and a rate of charge provided by the charging system.

14. The vehicle according to claim 13, wherein determining wireless charging usage is further based in part on a number of vehicle inputs comprising a vehicle bus, a vehicle charging module, a vehicle sensor, and a vehicle global navigation satellite system.

15. The vehicle according to claim 12, wherein the vehicle further comprises a camera, and wherein the instructions, when executed by the processor, further cause the processor to perform operations comprising:
causing the camera to take a snap-shot of a surrounding environment when the inductive charger is being energized; and
storing information corresponding to the snap-shot and the wireless charging usage for transaction reconciliation disputes.

16. The vehicle according to claim 12, wherein the charging source has a charging zone, and wherein the instructions, when executed by the processor, further cause the processor to perform operations comprising:
receiving real time information corresponding to an availability of the charging source, a location of the charging source, and a timing at which the inductive charger will be moved into the charging zone; and
determining a preferred driving route for the vehicle to take for the inductive charger to be moved into the charging zone.

17. A method of determining wireless charging usage, comprising:
providing a charging system comprising a charging source;

providing a vehicle comprising an inductive charger configured to receive a charge from the charging source, and a processor electrically connected to the inductive charger;

receiving at the processor a wireless alert notification from the charging system;

energizing the inductive charger based on a response to the wireless alert notification; and determining wireless charging usage responsive to the inductive charger being energized.

18. The method according to claim 17, further comprising automatically sending payment from the processor to a provider that operates the charging system, corresponding to the wireless charging usage.

19. The method according to claim 17, wherein energizing the inductive charger is performed with the vehicle moving at a speed greater than zero.

20. The method according to claim 17, wherein the charging source has a charging zone, and wherein determining wireless charging usage is based in part on a position of the inductive charger with respect to the charging zone, a speed of the vehicle, a length of time in which the inductive charger has been energized, a rate of charge provided by the charging system, and a number of vehicle inputs comprising a vehicle bus, a vehicle charging module, a vehicle sensor, and a vehicle global navigation satellite system.

* * * * *